United States Patent [19]

Iida et al.

[11] Patent Number: 5,258,798
[45] Date of Patent: Nov. 2, 1993

[54] CAMERA

[75] Inventors: Takashi Iida; Hiroyuki Tsumazawa; Masatoshi Itoh; Hiroshi Kiten, all of Osaka, Japan

[73] Assignee: Minolta Camera Kabushiki Kaisha, Osaka, Japan

[21] Appl. No.: 974,336

[22] Filed: Nov. 10, 1992

Related U.S. Application Data

[63] Continuation of Ser. No. 778,746, Oct. 18, 1991, abandoned, which is a continuation of Ser. No. 653,739, Feb. 11, 1991, abandoned, which is a continuation of Ser. No. 496,190, Mar. 21, 1990, abandoned, which is a continuation of Ser. No. 373,525, Jun. 30, 1989, abandoned, which is a continuation of Ser. No. 154,109, Feb. 9, 1988, Pat. No. 4,847,650.

[30] Foreign Application Priority Data

Feb. 10, 1987 [JP] Japan .................................. 62-28564

[51] Int. Cl.$^5$ ............................................. G03B 13/36
[52] U.S. Cl. ................................ 354/400; 354/195.12
[58] Field of Search ............... 354/400, 402, 195.1, 354/195.11, 195.12, 195.13

[56] References Cited

U.S. PATENT DOCUMENTS

| | | | |
|---|---|---|---|
| 3,913,113 | 10/1975 | Yamashita | 354/195 |
| 3,972,056 | 7/1976 | Tsujimoto et al. | 354/402 |
| 4,000,501 | 12/1976 | Sakaguchi et al. | 354/195.12 |
| 4,002,405 | 1/1977 | Stahl | 354/195.1 |
| 4,008,951 | 2/1977 | Himmelsbach | 350/187 |
| 4,183,639 | 1/1980 | Suwa | 354/195.1 |
| 4,445,757 | 5/1984 | Enomoto et al. | 354/195.12 |
| 4,500,191 | 2/1985 | Yamanaka | 354/418 |
| 4,556,907 | 12/1985 | Urata et al. | 352/140 |
| 4,558,367 | 12/1985 | Urata et al. | 352/140 |
| 4,572,642 | 2/1986 | Yamamoto et al. | 354/195.1 |
| 4,647,979 | 3/1987 | Urata | 354/430 |
| 4,697,891 | 10/1987 | Kawai | 354/406 |
| 4,705,380 | 11/1987 | Yamamoto et al. | 352/140 |
| 4,749,268 | 6/1988 | Moskovich et al. | 350/429 |
| 4,816,860 | 3/1989 | Iida et al. | 354/402 |

FOREIGN PATENT DOCUMENTS

| | | |
|---|---|---|
| 56-47533 | 11/1981 | Japan . |
| 60-143309 | 7/1985 | Japan . |
| 60-211414 | 10/1985 | Japan . |
| 61-264307 | 11/1986 | Japan . |

Primary Examiner—Russell E. Adams
Attorney, Agent, or Firm—Burns, Doane, Swecker & Mathis

[57] ABSTRACT

A camera has a zoom lens which includes a variator and a compensator. However, in order to simplify the whole external form of the camera, reduce the size thereof, and further to materially eliminate the treatment of appearance of the taking lens, a linear movement means which includes a threaded shaft provided for linearlly moving a variator and a compensator composing a zoom lens and the nuts to be engaged with the threaded shaft and an electrically driving means for driving this linear movement means are covered by a housing of a camera body, a zoom operation key provided on this housing is caused to be operationally related to an electric circuit which drives and controls the motor.

5 Claims, 12 Drawing Sheets

| ZONE | CODE |
|---|---|
| TELE END | 111 |
| 1 ZONE | 101 |
| 2 ZONE | 100 |
| 3 ZONE | 110 |
| 4 ZONE | 010 |
| 5 ZONE | 011 |
| 6 ZONE | 001 |
| WIDE END | 000 |
Fig. 9
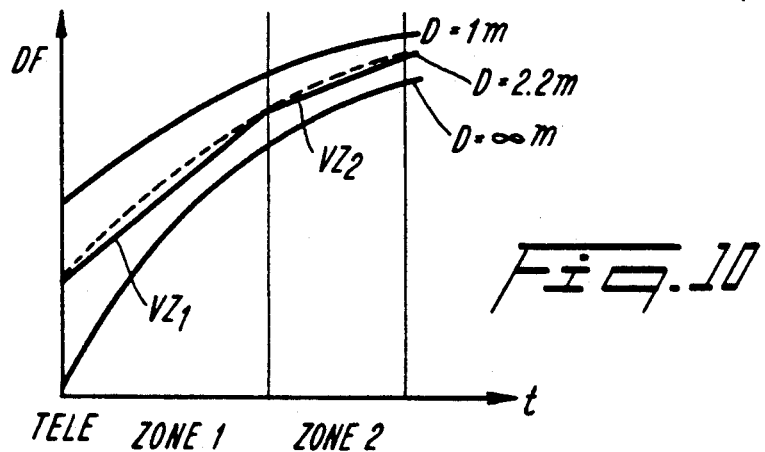
Fig. 10
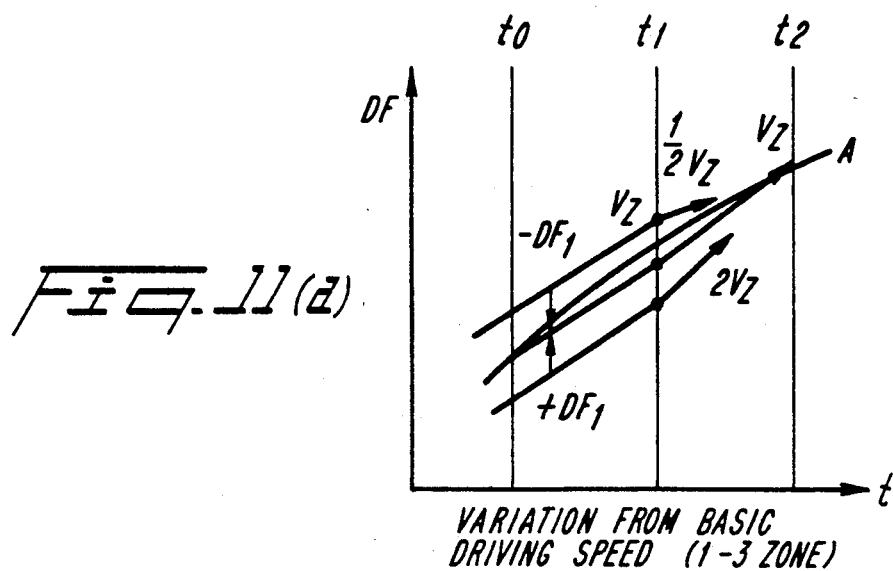
Fig. 11(a)
VARIATION FROM BASIC DRIVING SPEED (1-3 ZONE)

VARIATION FROM LOW SPEED (1-3 ZONE)

VARIATION FROM HIGH SPEED (1-3 ZONE)

VARIATION FROM BASIC DRIVING SPEED (4-6 ZONE)

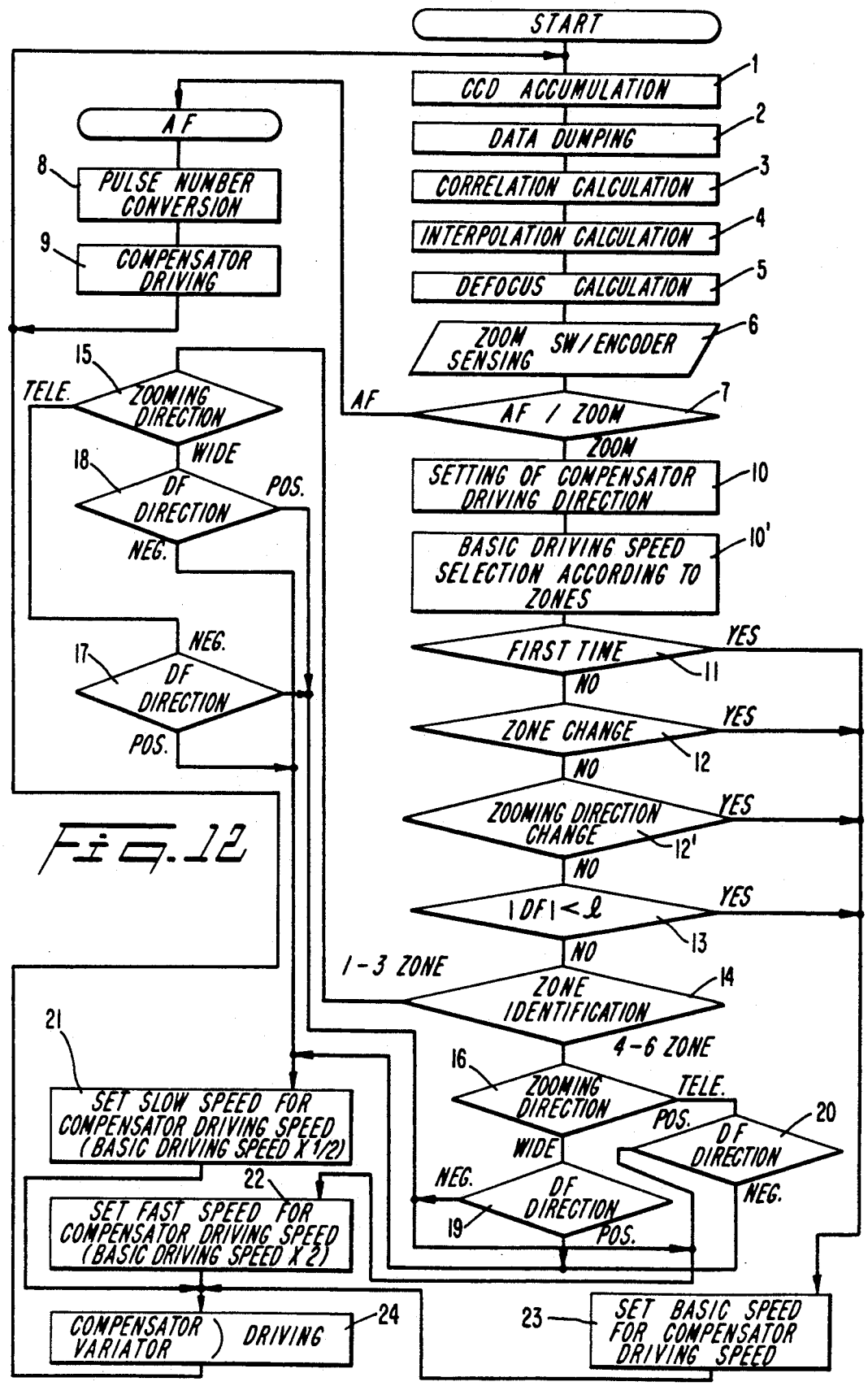

CAMERA

This application is a continuation of application Ser. No. 07/778,746, filed Oct. 18, 1991 now abandoned, which is a continuation of application Ser. No. 07/653,739, filed Feb. 11, 1991 now abandoned, which is a continuation of application Ser. No. 07/496,190, filed Mar. 21, 1990 now abandoned, which is a continuation of application Ser. No. 07/373,525, filed Jun. 30, 1989 now abandoned, which is a continuation of application Ser. No. 07/154,109, filed Feb. 9, 1988 now U.S. Pat. No. 4,847,650.

BACKGROUND OF THE INVENTION

1. Field of the Invention

The present invention relates to a camera and more specifically relates to such camera having a zoom lens which includes a variator and a compensator.

2. Description of the Prior Art

There has been suggested some cameras in which magnification is varied by a variator i.e., a magnification variable lens and the shift of the focal plane generated by the magnification variation is compensated by the compensator acting as a focus lens, and there exists among such cameras various types which are equipped with zoom operating rings and the like in addition to stationary cylinders for retaining lens as disclosed in Japanese patent laid-open publication No. 211414/1985 or those having only the stationary cylinders but without zoom operating rings or focus operating rings. However, according to those examples of the conventional camera, the taking lens is arranged to project from the camera body in each example, and as the whole appearance of the camera, the camera body and the taking lens assembly constitute two major components. On the other hand, as a video camera of a fixed lens type having no zooming function, there is one in which the taking lens section is arranged inside the camera body. However, this type of camera is a low grade type camera which does not have a zooming operation member and a focus adjustment member for zooming and thus a zooming function do not exist in such camera.

In a camera having a zooming function, the projection of taking lens section from the camera body requires the treatment of appearance of the taking lens section and costs of the camera become high. In addition, because of the projection of the taking lens section, overall form of the camera is likely to become very rugged and tends to become large in size. Furthermore, the degree of freedom in design concerning the form of appearance of the camera is narrowed.

SUMMARY OF THE INVENTION

An object of the present invention is therefore to provide a camera of simple form in appearance equipped with a zooming function wherein a taking lens section including a zoom lens is incorporated in the camera body itself.

Another object of the present invention is to provide a small camera with a zooming function.

Briefly speaking, in a camera according to the present invention, a linear movement means which includes a threaded shaft and nuts to be engaged with the threaded shaft provided for linearlly moving a variator and a compensator which compose a zoom lens and an electrical driving means for driving this linear movement means are covered by a housing of the camera body, and a zoom operation member provided on this housing is composed so that it is caused to be operationally related to an electric circuit for driving and controlling the electric driving means.

Therefore, according to the present invention, because the taking lens section including the zoom lens can be contained substantially in the housing of the camera body, the whole camera body can be reduced in size and simplified as well. Besides, because the appearance of the taking lens is not visible externally, the treatment of appearance thereof is unnecessary so that reduction in cost can be achieved and the lens is sufficiently protected. Further, it becomes possible to freely design the appearance and form of the camera.

BRIEF DESCRIPTION OF THE DRAWING

These and other objects and features of the present invention will become apparent from the following description taken in conjunction with preferred embodiment thereof with reference to the accompanying drawings, throughout which like parts are designated by like reference numerals, and in which:

FIG. 7 is a diagram showing an overall construction by way of circuits concerning the focus control during zooming.

FIG. 8 and FIG. 9 are diagrams for explaining partial construction shown in FIG. 7.

FIG. 10 and FIG. 11 are diagrams illustrating the principle with respect to the focus control during zooming.

FIG. 12 is a flowchart in connection with the focus control operation during zooming.

DETAILED DESCRIPTION OF THE PREFERRED EMBODIMENT

Figure 1:
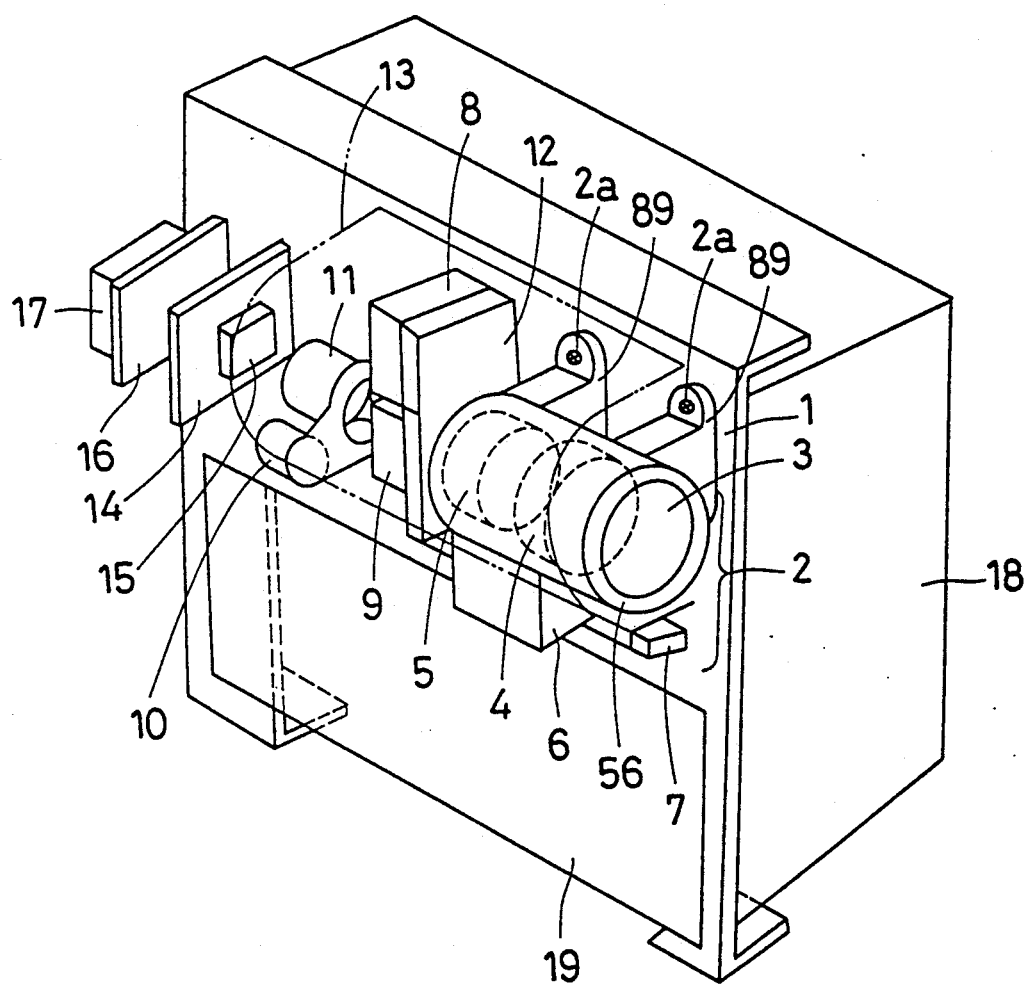
FIG. 1 is a schematic perspective diagram showing an internal construction of a VTR (Video Tape Recorder) incorporated video camera of an embodiment of the present invention.

FIG. 1 is a schematic perspective diagram showing an internal construction of a VRT incorporated video camera of an embodiment of the present invention. In FIG. 1, on a frame 1, a lens block 2 is installed by means of machine screws 2a as shown. This lens block 2 comprises components such as a front lens 3, variator 4, compensator 5, a driving apparatus 6 including a zoom motor and an AF (auto focus) motor which drive the variator 4 and compensator 5 respectively along the optical axis, and an encoder for detecting the position of the variator 4, WB (white balance) light sensor section 7, focus condition detecting module 8 for AF (autofocus), half prism (semi-transparent prism) 9, diaphragm control meter 10, master lens 11, and lens mounting board 12 for connecting these components and a flexible lens substrate 13 which controls the driving apparatus 6, the WB light sensor section 7, focus condition detecting module 8 and diaphragm control meter 10. The aforementioned front lens 3, variator 4, and compensator 5 are contained in a single fixed cylinder 56 as explained in later part hereof, and there exist no zoom operating ring and focus operating ring. Therefore, the taking lens can be made very simple and small so that the entire lens system can be easily contained in the camera body. The fixed cylinder 56 which is not limitative thereto is formed by synthetic resin and has a pair of mounting sections 89 which is formed integrally. Therefore, the fixed cylinder 56 is arranged inside the housing of the camera body by fixing the mounting sections 89 on the frame 1 in the camera body with the machine screws 2a. Components described above which compose the lens block 2 are installed on the frame 1 by mounting them on this fixed cylinder 56. At the rear of the above lens block 2 is installed the CCD (charge coupled device) 15 soldered to the CCD substrate 14 by means of a member not shown in the diagram, and at the rear of this CCD 15, the EVF (electronic view finder) 17 which is a flat light-emitting display tube soldered to the EVF substrate 16 is fixed to the frame 1 and arranged. Furthermore, on the frame 1, the video substrate 19 for carrying out the system control for processing signal supplied from the CCD 15 and driving the camera and the VTR deck 18 are fixed.

Figure 2:
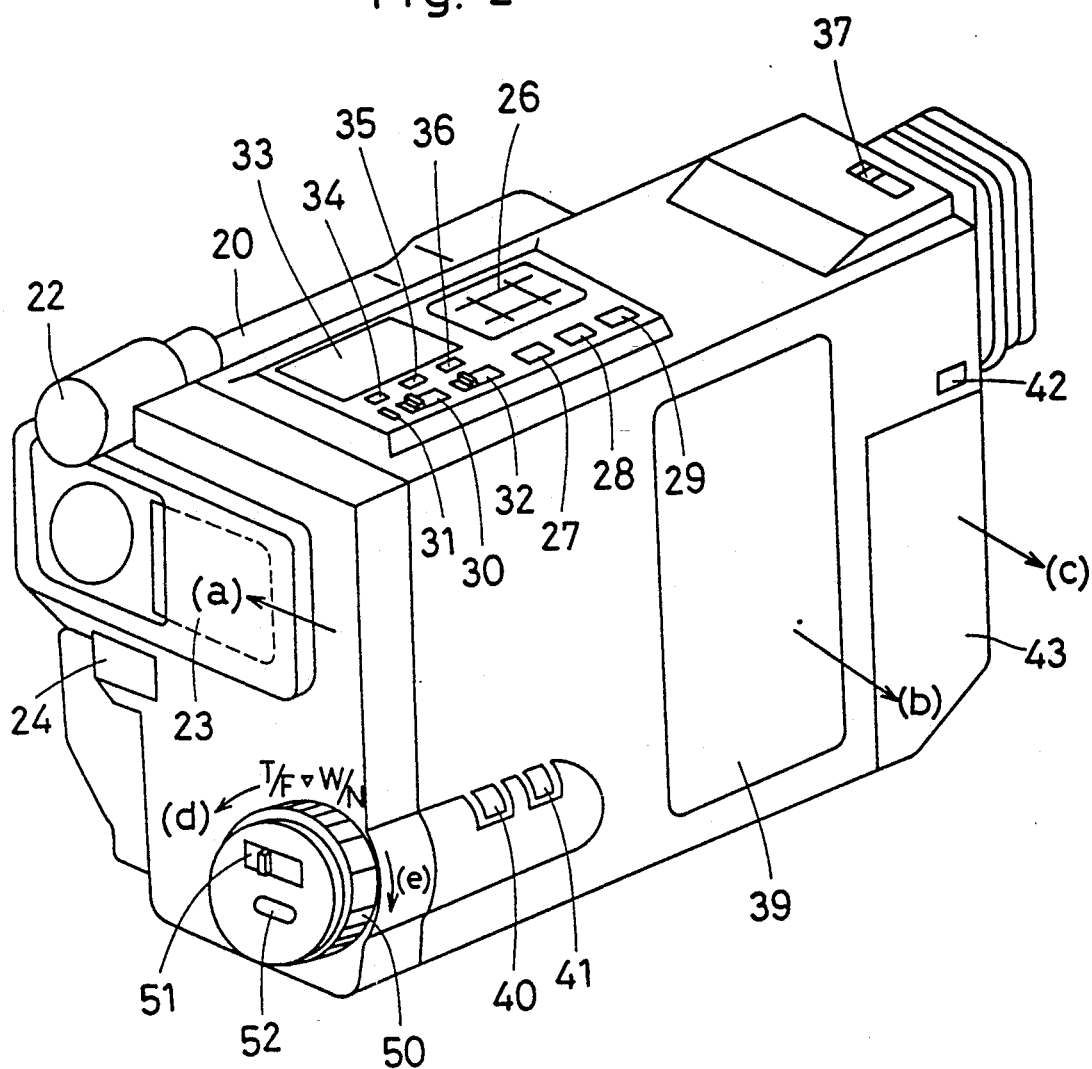
FIG. 2 and FIG. 3 represent a perspective diagram of the appearance of the aforementioned video camera.
Figure 3:
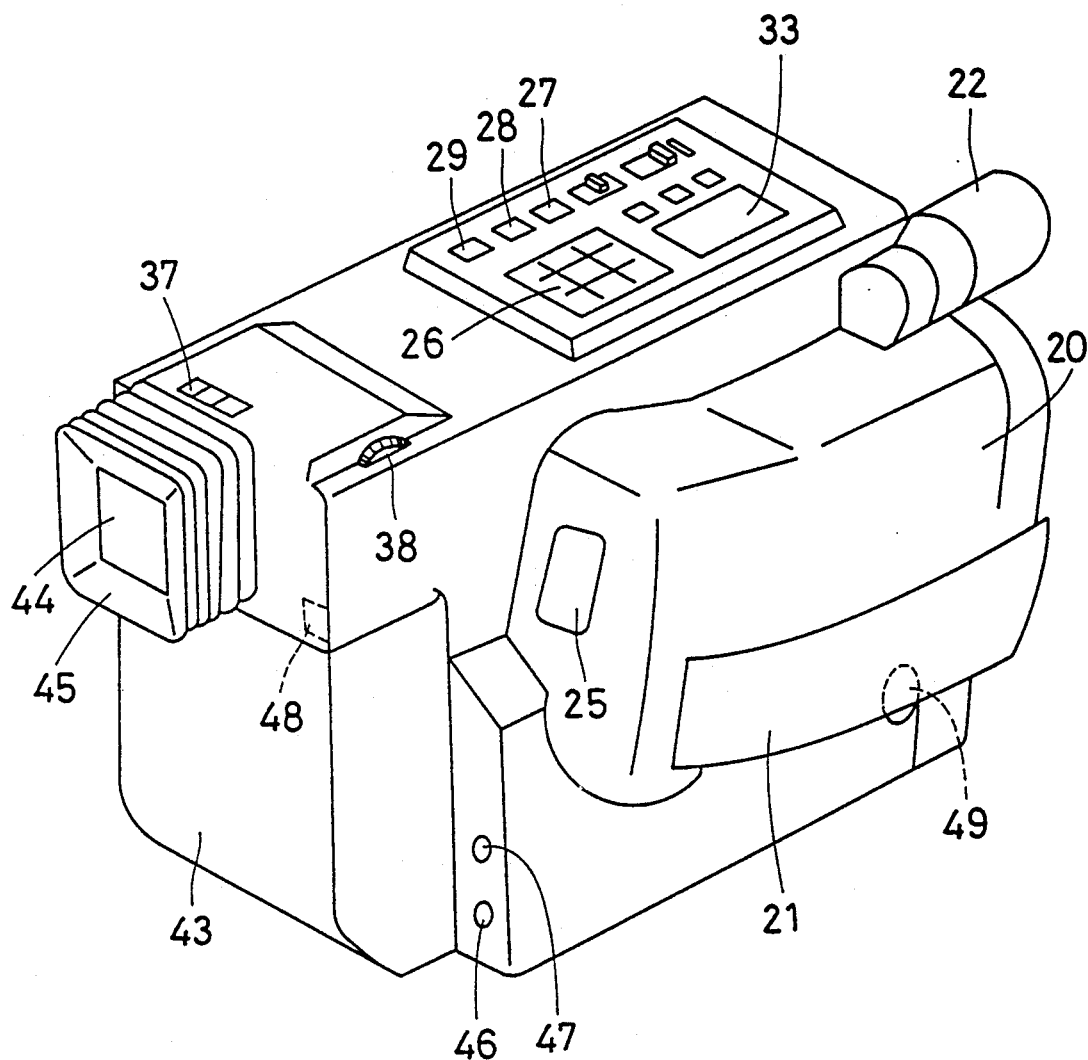

FIG. 2 and FIG. 3 are perspective diagrams of the appearance of the above VTR integrated video camera, and with the camera viewed from its rear, a grip 20 on the right side is for containing the lens block 2. A hand strap 21 is installed on this grip 20. A microphone 22 is installed freely detachably on the upper front of the grip 20. The slider 23 moves into the direction of arrow (a) so as to protect the front surface of the lens. WB light sensor window 24 is located at the front of the above WB light sensor section 7 and composed of the white diffusion plate, and a trigger button 25 is provided at the rear of the grip 20.

In addition, control switch 26 is arranged on the upper surface of the camera to thereby control operation of nine modes of PLAY (playback), FF (fast forward), REW (rewinding), STOP (stopping), PAUSE (temporary stopping), REC (picture recording), EJECT (taking out cassette), MONITOR (image monitor), and RECREVIEW (checking of recorded picture). AE (automatic exposure) lock switch 27 is arranged for locking the exposure value temporarily. The WB lock switch 28 is arranged for locking the white balance. The date switch 29 is arranged for controlling turning on and off for superimposing dates. Designation 30 shows the power switch, 31 shows the light emission diode which lights when the power switch 30 is turned on, 32 shows the EP/SP (Extended Play/Standard Play) switch to change over the recording mode between a long time and a standard time, 33 shows the liquid display to indicate the operation mode of the deck, the date or the counter, and 34 shows the mode switch to change over the above counter and dates. Setting switches 35, 36 are used for setting dates and equipped with functions as the resetting switch as well as the memory switch for the counter.

A diopter adjusting knob 37 is equipped on the upper rear of the camera for adjusting the diopter of the view finder. A tracking knob 38 is useful for tracking adjustment during playback. A cassette lid 39 on the left side of the camera moves into the direction of arrow (b) by the operation of the EJECT switch and is used as the opening for inserting and taking out cassette, and fade switch 40 is used to carry out the fade-out while it is held depressed and the fade-in when released after the depression respectively. FM (finder magnification) switch 41 is driven to enlarge the image of the above EVF 17. A lock button 42 is used to remove the battery case 43 by pulling it into the direction (c) while depressing the lock button. An eyepiece 44 is constructed on the rear of the camera. Designation 45 shows an eyepiece hood, 46 shows an earphone terminal to monitor input and output of the sound, 47 shows a remote control terminal to turn on and off the tape driving, 48 shows a DC input terminal, and 49 shows an AV terminal for inputting and outputting the image signal and sound signal.

Figure 4:
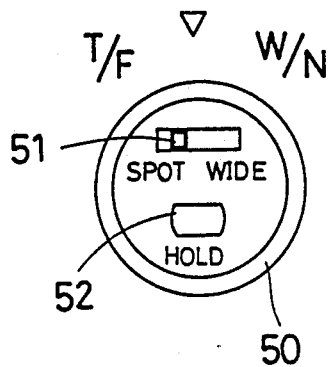
FIG. 4 is a diagram for explaining the operation section.
Figure 5:
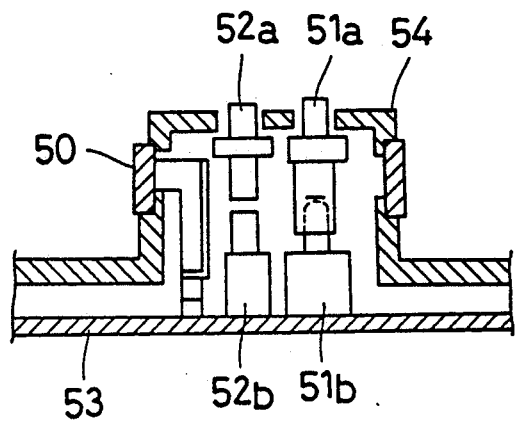
FIG. 5 is a cross sectional diagram of the operation section shown in FIG. 4.

At the lower front part of the camera in FIG. 2, the operation section of the taking lens driving apparatus of the present invention is provided. As shown in FIG. 4, this operation section consists of a ring-shaped zoom/-focus ring 50 as the zoom switch operation section, an AF mode switch 51 which is provided inside of this zoom/focus ring 50 and used to change over the auto focusing mode between the spot and wide, and a hold button 52a as the change-over switch operation section provided under the AF mode switch 51 inside the zoom/focus ring 50. FIG. 5 shows the cross section of the operation section, and the AF mode switch 51 comprises a slide switch 51b which is fitted into the AF mode knob 51a projecting from the front plate 54 and the lower end thereof is soldered to the zoom substrate 53. The AF mode switch 51 interlocks with the movement of the AF mode knob 51a. The hold button 52a is composed of a push-on and push-off switch 52b soldered to the zoom substrate 53 so as to be able to contact the lower end of the hold button 52a and the hold switch 52 as the change over switch to change over the auto focus mode and manual focus mode. When this hold switch 52 is turned off, the auto focus mode is effected and when the hold switch 52 is turned on, the manual focus mode is effected. In the auto focus mode, the zoom/focus ring 50 has a two-step switching mechanism which functions as the zoom switch, and zooming is accomplished respectively toward the long focal length side (TELE) when the zoom/focus ring 50 is rotated into the direction of arrow (d) of FIG. 2 and toward the short focal length side (WIDE) when rotated into the direction of arrow (e), and when the ring 50 is rotated further, high speed zooming can be accomplished either toward the long focal length side or toward the short focal length side. This zoom/focus ring 50 function as the focus switch in the manual focus mode and the focus can be made on the photographic subject at a far position (FAR) or at a near position (NEAR) by respectively rotating the ring 50 into the direction (d) or (e).

Figure 6:
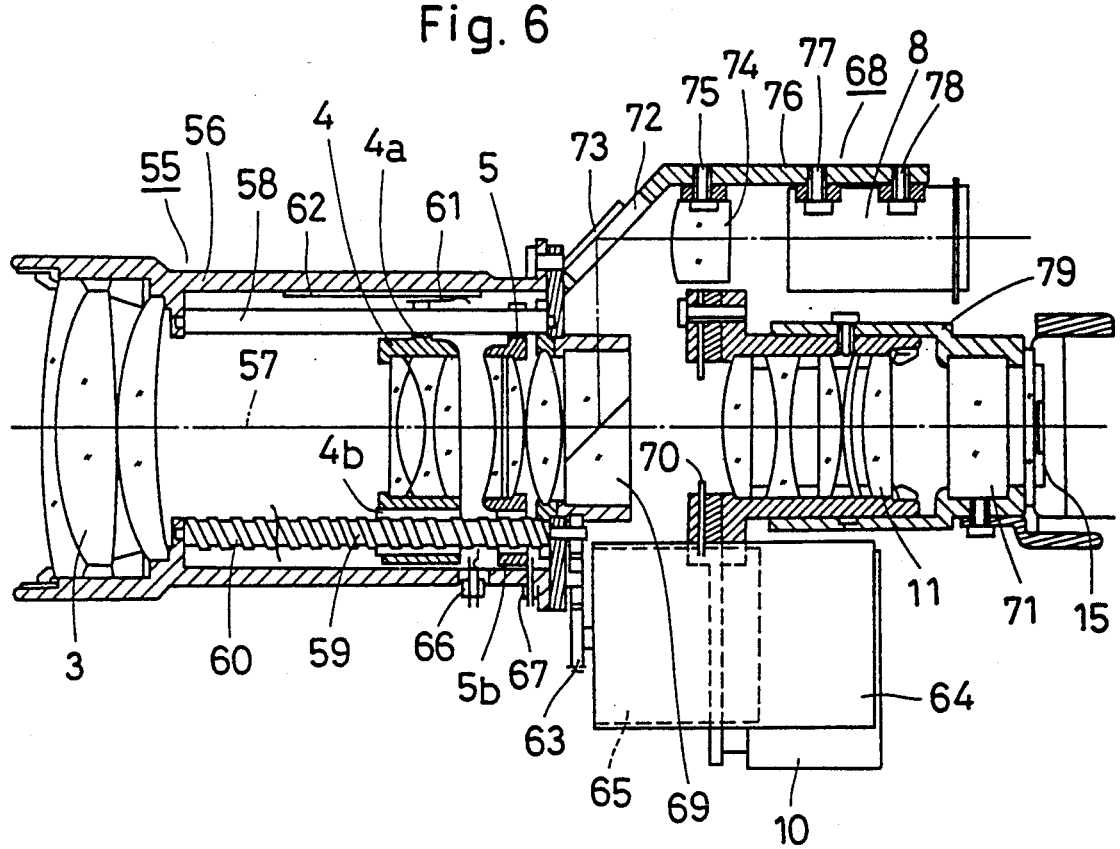
FIG. 6 is a cross sectional diagram showing a construction mainly of an optical system of the video camera.
Figure 1:
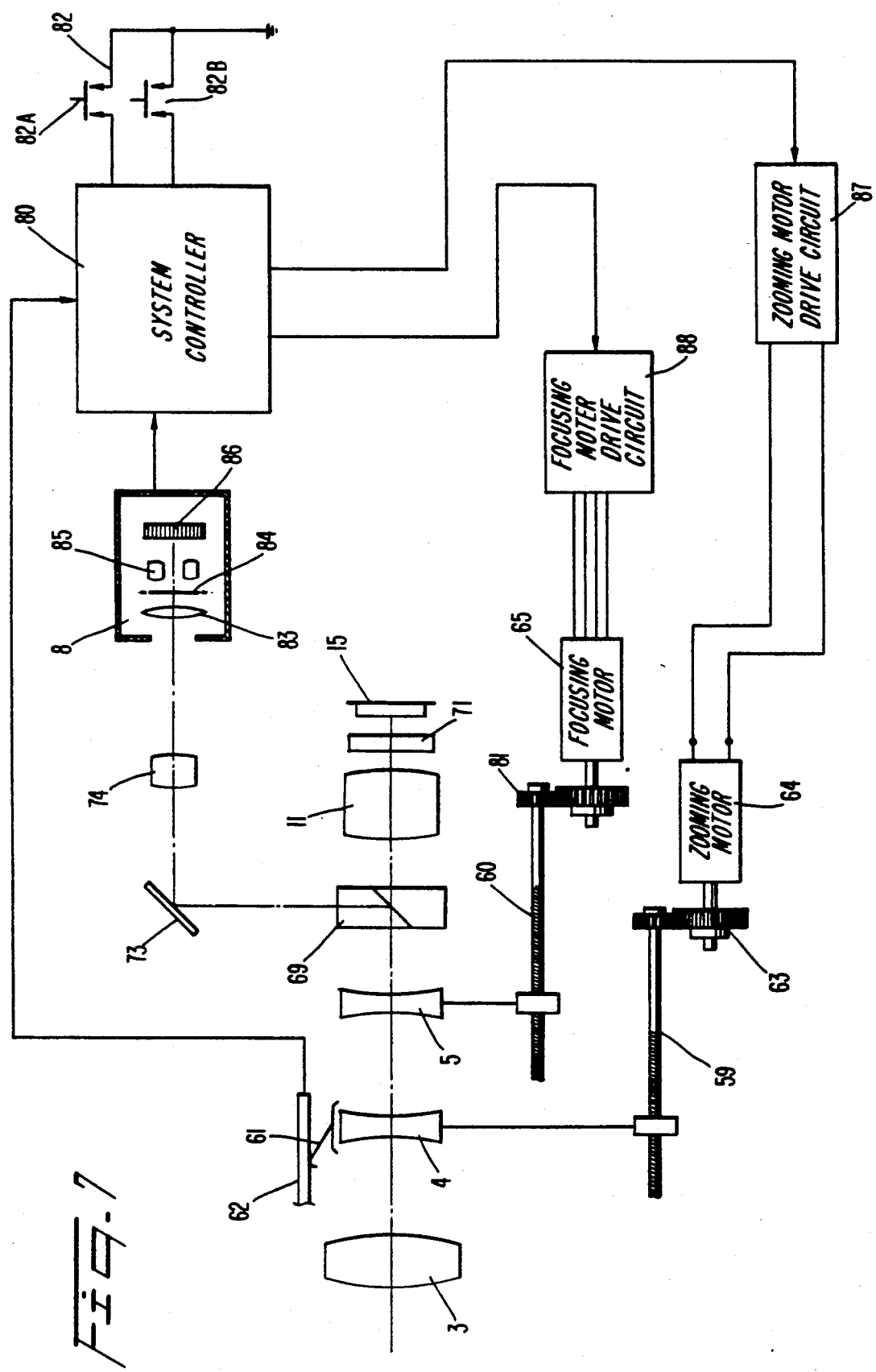

Next, of the constructions as described above, FIG. 6 shows the detailed construction of the optical system in particular. In FIG. 6, the taking lens 55 has inside a cylindrically-shaped fixed cylinder 56 front lens group 3, variator 4 for magnification variation, and compensator 5 for image plane compensation (for focus compensation). The front lens group 3 is fixed while the variator 4 and compensator 5 are provided movably as subsequently described. The variator 4 comprises the magnification variable lens group and the focal length is changed by the movement thereof. The compensator 5 comprises the focus lens group so as to compensate the displacement of the image plane resulting from the movement of the aforementioned variator 4. This compensator 5 is driven by a driving means which is independent of the aforementioned variator 4. Inside the aforementioned fixed cylinder 56 is arranged and provided with the guide bar 58 which is parallel with the optical axis 57 and the first and second lead screws 59, 60. The guide bar 58 is arranged along the longitudinal direction of the fixed cylinder 56 in the vicinity of the internal surface of the fixed cylinder 56. In the like manner, the first and second lead screws 59, 60 are arranged in the fixed cylinder. The lead screws are shown on the same straight line in the diagram, but in practice, they are arranged at a position in different directions vertical to the surface of the paper, and are freely rotatable by means of the motors 64, 65 to be described later.

The variator 4 has the recessed groove 4a in part thereof by which it is fitted loosely and slidably in the aforementioned guide bar 58, and moves while being guided by the guide bar 58 when it is to be moved in the direction (toward the right and left directions in the diagram) along the optical axis 57. The variator 4 has the meshing section 4b with threaded groove which is provided on the opposite side of the side where the aforementioned recessed groove 4a is provided, and is meshed with the aforementioned first lead screw 59 by means of this meshing section 4b. Furthermore, the variator 4 is mounted with the sliding brush 61 sliding and moving over the contact strip of a zoom encoder 62 installed on the internal surface of the fixed cylinder 56. The construction and function of this zoom encoder 62 will be described later in detail with reference FIG. 8. Likewise, the compensator 5 has the same recessed groove by which it is loosely and freely slidably fitted in the guide bar 58, and the other end of the compensator 5 is meshed with the second lead screw 60 by means of the meshing section 5b. The first lead screw 59 for driving the aforementioned variator is joined with the zoom motor 64 by means of the gearing mechanism 63 and rotated by the rotation of the zoom motor 64. The second lead screw 60 for driving the compensator is also joined with the motor 65 for AF by means of the gearing mechanism 81 shown in FIG. 7. In addition, the taking lens 55 is provided with a near side limit switch 66 and a far side limit switch 67 which control the compensator 5. The camera body 68 containing the taking lens 55 has an image pickup optical system comprising a half prism 69, diaphragm 70, master lens group 11, low pass filter 71, CCD 15 for image pickup, and diaphragm control meter 10 and a focus condition detecting optical system comprising a reflection mirror 73 mounted on a retainer frame window 72, a lens 74, and the focus condition detecting module 8.

The lens 74 is fixed on a retaining frame 76 by a machine screw 75, and likewise the focus condition detecting module 8 is fastened to the retaining frame 76 by means of a machine screws 77, 78. The diaphragm 70, master lens group 11, and low pass filter 71 are fixed in a retaining cylinder 79 disposed along the optical axis 57 in the camera body 68.

The light coming from the photographic subject passes through the front lens group 3, variator 4, and compensator 5, most of the light advances straightly through the aforementioned half prism 69, passes through the master lens group 11, and low pass filter 71, and introduced into the CCD 15 for image pickup. On the other hand, a part of the light of the photographic subject which is bent at right angle by the half mirror 69 passes through the reflection mirror 73 and the lens 74, and reaches the focus condition detecting module 8 which incorporates components such as the CCD line sensor for AF.

FIG. 7 shows understandably, in terms of circuitry, the calculation process mainly of a system controller 80 comprising a microcomputer and the construction of the driving control of the variator 4 and compensator 5. In the diagram, the zoom operation key section 82 has two switches, that is, one is TELE switch 82A which carries out the zoom operation into the TELE direction and the other is a WIDE switch 82B which carries out the zoom operation into the WIDE direction. This zoom operation key section 82 corresponds to the ring 50 when the zoom focus ring 50 is in auto focus mode shown in FIG. 4, and by rotating the ring 50 into the direction of arrow (d) or (e), the TELE switch 82A or WIDE switch 82B is turned on.

The focus condition detecting module 8 is consisted of a condenser lens 83 focusing the light which has passed through the different pupil of the lens 74, a diaphragm mask 84, a pair of image re-formation lenses 85, and a CCD line sensor 86, and by detecting the relative positional relation of the two images of photographic subject formed on the CCD line sensor 86, the amount and the direction of shift of an image to be pickup from a predetermined focal plane is detected. Incidentally, the detection of the focus condition such as this is described in Japanese patent laid-open publication No. 4914/1985. The zoom motor 64 and the focus motor 65 are driven respectively by the zooming motor drive circuit 87 and the focusing motor drive circuit 88. The focus motor 65 is formed by the step motor though it is not limitative to the step motor.

Figures 8A, 8B:
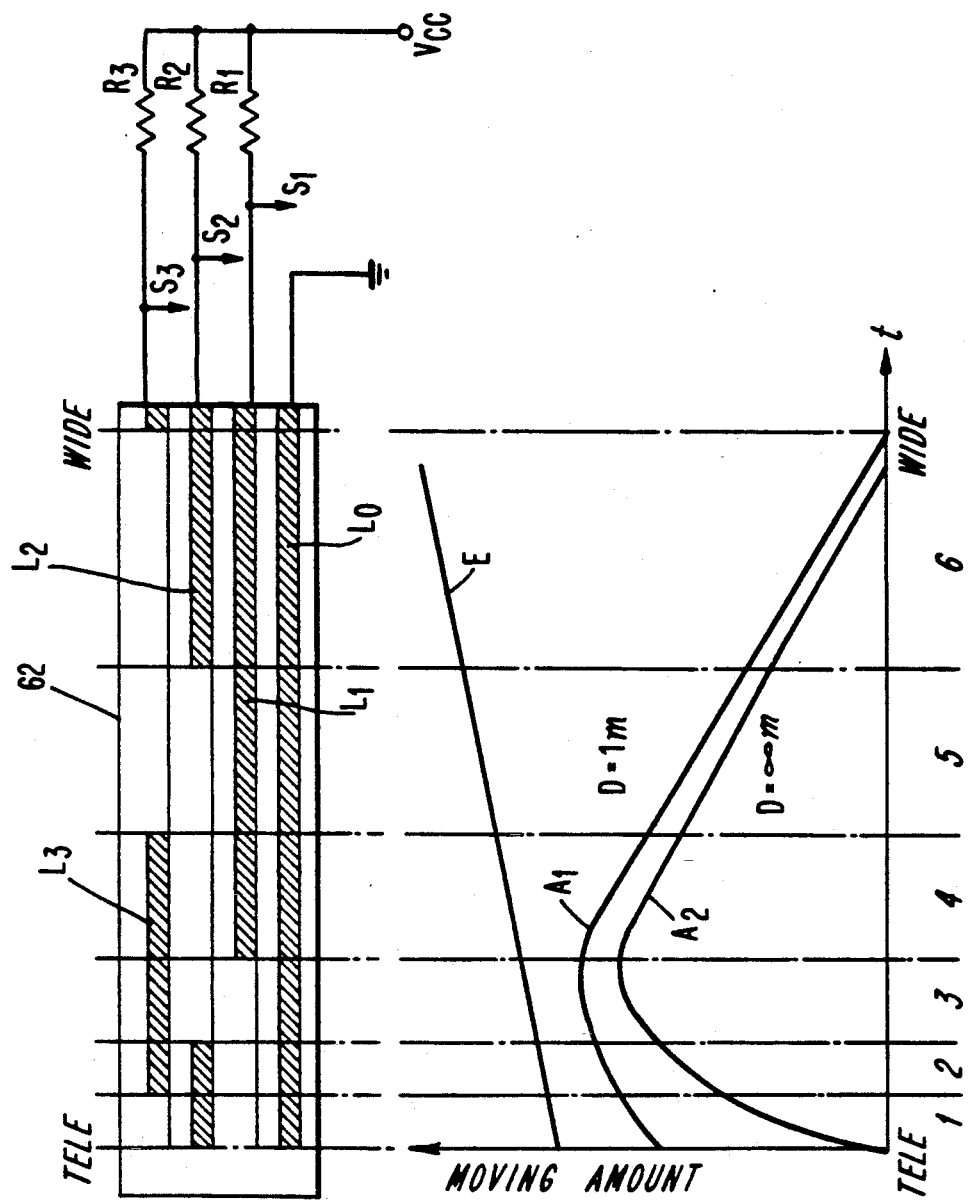

FIG. 8(a) shows the construction of the zoom encoder 62 shown in FIG. 7. This zoom encoder 62 has a sliding contact strip section made of conductive material which is formed so as to have the Gray code, and comprises a common contact strip ($L_0$) to be connected to the earth, first, second, and third contact strips ($L_1$)($L_2$)($L_3$) connected to the power (Vcc) via resistor ($R_1$)($R_2$)($R_3$) respectively, and the entirety thereof is, for example, formed on the flexible printed circuit board. A sliding brush 61 mounted on the variator described above has four contacts ($M_0$)($M_1$)($M_2$) ($M_3$) which are integrated in one unit with conductive material and each of them contacts correspondingly to the common contact strip ($L_0$) and the first, second, and third contact strips ($L_1$)($L_2$)($L_3$) of the zoom encoder. Such contacts are effected at the center of the contact strips ($M_0$)($L_1$)($L_2$)($L_3$) or the part above thereof. Therefore, at the portion where the contact strip is narrowed, the contact of the brush 61 becomes in status of non-contact, and the signal ($S_1$)($S_2$)($S_3$) generated at the output point become high level. In contrast with the above, at the portion where the contact strip is wide, because the brush 61 becomes in contact therewith, the potential of the output point drops to the earth level (low level) through the brush 61 and the common contact strip ($L_0$). According to the position of the brushes against the aforementioned first, second, and third contact strips $(L_1)(L_2)(L_3)$, the combined data (3 bit signals) of the aforementioned output signals $(S_1)(S_2)(S_3)$ vary. Data (FIG. 9) of the six zones (1) through (6), TELE end (TELE), and WIDE end (WIDE) classified according to this combination are used not only for controlling the variator 4 but also as the positional signal for controlling the driving speed of the compensator 5. In addition, in FIG. 8(a), the TELE end (TELE) side and the WIDE end (WIDE) side are drawn in reverse arrangement with respect to those arrangements shown in FIG. 6 and FIG. 7. That is to say, in FIG. 6 and in FIG. 7, the right side is the TELE side and the left side is the WIDE side.

Relative to the zones 1 through 6 of the zoom encoder 62 shown in FIG. 8(a), FIG. 8(b) shows the correlation of the moving amount of the variator 4 and compensator 5 to hold the image position at the same position when the variator 4 is driven so as to carry out the zooming. In this diagram, line (E) represents the motion of the variator 4, and curved lines $(A_1)(A_2)$ denote the motion of the compensator 5 when the distance D of the photographic subject is $D = 1$ m and $D = \infty$ respectively. The abscissa represents the focal length (f) and the coordinate represents the moving amount.

Figure 11B:
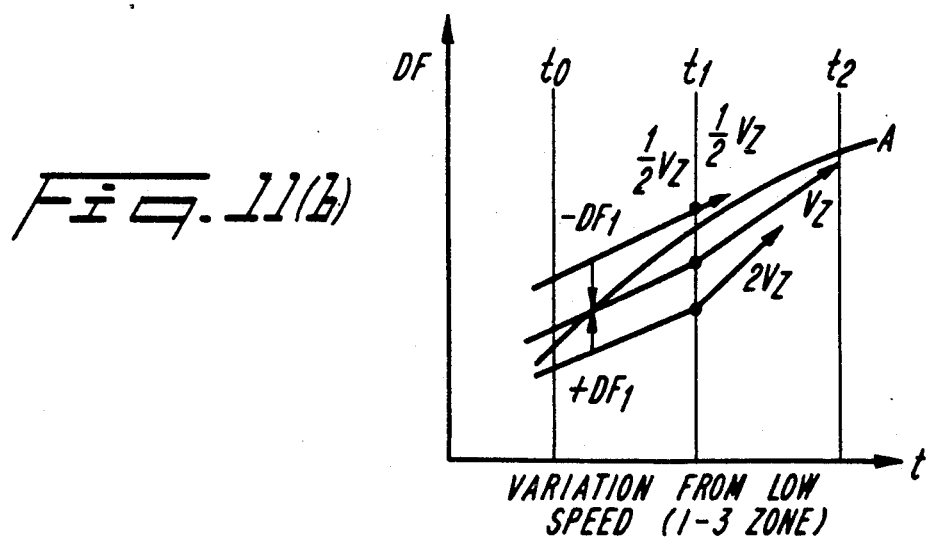
Figure 11C:
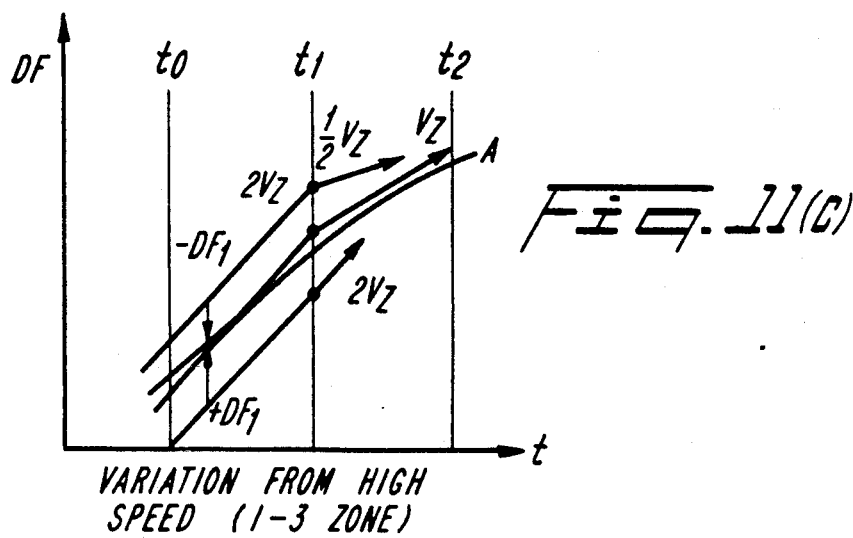
Figure 11D:
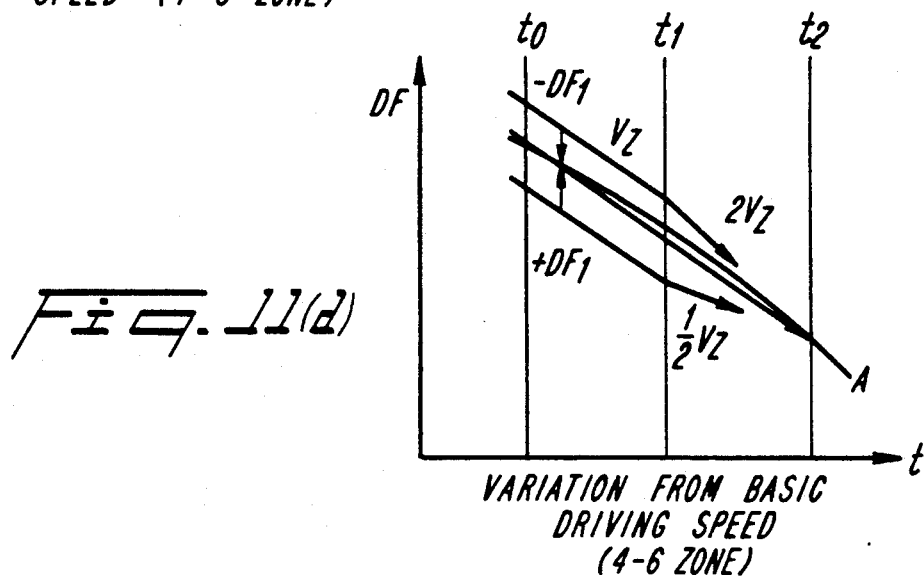

Next, the principle of focus compensation during zooming according to the embodiment of the present invention will be described with reference to FIG. 10 and FIG. 11. In the first place, the basic driving speed which is different by each zone (1) through (6) shown in FIG. 8 is stored in the ROM in advance. This basic driving speed is the speed expressed by the mean inclination of an ideal follow-up characteristic of the compensator in the each zone. To explain this by way of FIG. 10, it is caused to be represented by the inclination almost at an intermediate position between $D = 1$ m and $D = \infty$ of the distance D to the photographic subject, for example by the inclination (Vzn) (n denotes the zone number) when $D = 2.2$ meters. Furthermore, the curve of the moving amount characteristic of the compensator (5) differs in its inclination according to the distance to the photographic subject, and the difference becomes the greatest at the TELE end (TELE) as shown in the diagram. In addition, because there is a limit in division of the zone, there are times that the inclination becomes a curve within the zone. Based on the condition such as above, the basic driving speed (Vzn) is used in the first place as the driving control. Furthermore, a control system is adopted to have the driving speed of K·Vzn ($K = K_1$ or $K_2$ when $0 < K_1 < 1 < K_2$) according to the result of focus condition detection. For example, in FIG. 11(a) through (c), $(t_0)(t_1)(t_2)$ represent the timing to end the focus condition calculation, the curve (A) represents the ideal follow-up curve of the compensator, (Vz) represents the basic driving speed of that zone, $(+DF_1)(-DF_1)$ represent the defocus amount corresponding to the shift from the ideal follow-up curve (A) detected at the time $(t_1)$. When $(t_0)(t_1)(t_2)$ are assumed to be in the same zone, when the compensator 5 is driven at the basic driving speed (Vz) in $(t_0)$ and the defocus amount over $(+DF_1)$ is detected at $(t_1)$ as shown in FIG. 11(a), the shift is judged to be large, and the speed is doubled to (2 Vz) at $(t_1)$ thereby bringing close to the ideal follow-up curve (A). Conversely, when the defocus amount less than $(-DF_1)$ is detected at $(t_1)$, the speed is halved to (Vz/2) at $(t_1)$. When the defocus amount over a fixed value $(|DF_1|)$ cannot be detected at $(t_1)$, the shift is judged to be small and the same driving speed is maintained. As shown in FIG. 11(b), if the speed is changed at $(t_0)$ and the compensator 5 is being driven at (Vz/2) speed, when the defocus amount over $(+DF_1)$ is detected at $(t_1)$ likewise, it is judged that the shift is large and that the difference between the shift and the ideal follow-up curve (A) tends to become greater, and the speed is set to (2Vz). Conversely, when the defocus amount less than $(-DF_1)$ is detected at $(t_1)$, it is judged that the shift is large now but the shift tends to become slight, and the speed is maintained at (Vz/2) to bring close to the curve (A), and when the defocus amount over a fixed value $(|DF_1|)$ cannot be detected at $(t_1)$, it is judged that the shift is small but the shift tends to expand, and the speed is returned to (Vz). In FIG. 11(c) also, the driving speed is varied into the direction to reduce the shift. By carrying out the control such as above to the basic driving speed (Vzn) by each zone, the follow-up performance of the compensator during zooming is realized. In the description of above, the driving speed may be changed to two times or ½ times of (Vz) according to the detected defocus amount and the speed is controlled in three speeds including the basic driving speed (Vz), but by further dividing the driving speed, it is possible to cause the follow-up performance of the compensator to be raised to the accuracy of a high degree.

Next, the focus compensating operation will be described according to the flowchart of FIG. 12. In this flowchart, the steps (#1) through (#9) are the same as those of the normal auto focus. When either of the REC (picture recording) button or PAUSE button or REC-REVIEW button of the control switch 26 on the camera shown in FIG. 2 is operated, the power is supplied to the camera section. As the power is supplied, the flow chart in FIG. 12 is started off by the system controller 80. Then, the accumulation of the CCD line sensor 86 is carried out at the step (#1) and the charge is accumulated while accomplishing the photoelectric conversion of the light from the photographic subject in the focus condition detection area. After the charge in the CCD line sensor 86 has reached a sufficient level required for detection of the focus condition, the accumulation of the charge is stopped, and the charge is transferred to the system controller 80 as the signal of the photographic subject. The system controller 80 accomplished A/D conversion of the signal from the CCD line sensor 86, and then stores the converted signal into the memory (data dumping of the step #2). Then, the system controller 80 carries out the calculation of correlation calculation (at the step #3) based on the data in the memory. Correlation calculation is calculated to determine the distance between the two images formed by the two image reforming lenses 85 in the focus condition detecting module 8 and to obtain the maximum correlative position while shifting one image output by one pitch of the picture element from the reference position with respect to the other image output. If it is assumed that the image distance (reference image distance) under the in-focus condition is $(L_0)$, the image distance is large than $(L_0)$ in the case of rear focus, while the image distance is smaller than $(L_0)$ in the case of front focus so that the magnitude and direction of defocus are detected. Then, by using the interpolation calculation (step #4), the maximum correlative position is determined in pitch unit below decimal point based on the maximum correlative position obtained at step (#3) and the shift position therefrom.

From the difference between this value and (L₀), the defocus amount is obtained. Then, the value of the defocus amount in units of picture element pitch of the CCD is converted at the step (#5) into units of microns as the amount of shift of the focal plane. Now, in the step (#6), sensing is accomplished of the zoom operation key section 82 and zoom encoder 62 shown in FIG. 7, and at the step (#7), whether the zoom operation key section 82 is operated is judged. If it is judged as operated, the step goes to the zoom routine (ZOOM) and if not operated, then the step goes to the AF routine (AF). At the AF routine, the defocus amount obtained in the step (#5) is converted at the step (#8) into the amount necessary to cause the focus motor 65 in FIG. 7 to be driven so as to make a focus. In this embodiment, because the step motor is used as the focus motor 65, the pulse count value obtained by converting the defocus amount into the driving pulse number is used as the driving amount of the motor. Based on the defocus direction obtained in the step (#4) and the driving amount obtained in the step (#8), the focus motor 65 is driven actually in the step (#9). As a result of this, the compensator 5 moves and the focusing operation is carried out.

The above description is the same as the case of normal AF. When the zoom operation key section 82 is operated, the step is branched to the zoom routine (ZOOM) at the step (#7). Therefore, the operation during the zooming will hereafter be described. In the zoom routine, the driving direction of the compensator is first set according to the zooming direction and to the present zone (one of the zones (1) through (3) or one of the zones (4) through (6)). For example, if the WIDE switch 82B is depressed, the compensator 5 must be driven into the direction wherein the compensator 5 is moved forward in case the present zone is one of (1) through (3) corresponding to the zooming in the WIDE direction and must be driven into the direction wherein the compensator 5 is moved backward conversely, in case the present zone is one of (4) through (6). In step (#10), this direction is set. In addition, if the zooming is carried out between the zones (3) and (4), the moving direction of the compensation is reversed at switching of the zones (3) and (4). This function is also provided at the step (#10). Also, the basic driving speed according to the zone is selected by the step (#10'). Then, the driving speed is to be set after the step (#11), but because there is no information of defocus when the zooming is started, the step advances to the step (#23) via the step (#11) where it is judged whether it is immediately after the zooming has started (first time) or not. The basic driving speed according to the zone is set at the step (#23), and the driving of the variator (4) and compensator 5 is started at the same time at the step (#24). After the step (#24), the compensating operation returns to the step (#1), and the flows repeat again.

As described above, because there is no defocus information detected according to the variation of magnification when the zooming operation is started, this embodiment assumes that the zooming is carried out from the in-focus condition so that the first detected amount of defocus is ignored and the compensator 5 is driven from the basic driving speed. At and after the second time goes the zoom routine (ZOOM) from the steps (#6) (#7), and then at the step (#10) the driving direction of the compensator 5 is set in the same manner as the preceding setting of the driving direction. The step then goes to the step (#12) through the step (#10') because the zoom operation key section is kept operated. At the step (#12), it is judged that whether the zone of the encoder 62 which was sensed at the step (#6) is the same as the preceding zone or not, and if judged as the same zone, the flow goes to the step (#13), and if the zone is changed, then the flow goes to the step (#23) to set the basic driving speed. Furthermore, when the zooming direction is changed, the basic driving speed is used for driving the compensator 5 because the results of focus condition detection in such a case cannot be relied on. The reason is that there is a possibility that the accumulation is carried out during the reversion of the zooming direction. These steps (#12) (#12') are provided in accordance with the idea that adjusting to the basic driving speed of each zone is effective to reduce the driving error when the zone or the direction is changed. When the zooming direction is changed, the step (#23) can be skipped in order that the compensator 5 is driven at the speed at which the compensator has been driven before the change in zooming direction takes place. The countermeasure such as above should be made when the zone is changed.

With respect to the focus compensation, conditions wherein the zooming of or after the second time is started and the same zone is used will hereafter be described.

i) When the detected defocus amount is small in the same zone, the compensator is driven at the basic driving speed of the zone. That is, it is judged as NO at the step (#12) and the flow goes to (#13) where it is YES because $|DF|<1$, then the flow goes to (#23) where the basic driving speed is set, and the driving of the step (#24) is carried out. At the step (#24), the driving of the variator and compensator is maintained and the driving speed is set again.

ii) When the detected defocus amount is large in the same zone of the zones (1) through (3) in WIDE zooming mode where the focal length is varied from long focal length to short focal length, the driving speed is changed. That is, this is the case corresponding to FIGS. 11 (a) through (c), and it is judged as NO at the step (#12), the flow goes to (#13) where it is judged as NO because $|DF|\geq 1$, then the flow goes to (#14) where the zone is discriminated. Because the zone used is one of 1 through 3 zones, the flow goes to (#15) where the zooming direction is in WIDE mode, the flow goes further to (#18). At the step (#18), if the amount of defocus is (+DF), then the direction of defocus is judged as positive, the flow goes to (#22) to set the driving speed two times (2Vz) of the basic driving speed, and the driving is effected in the step (#24). Conversely, if the amount of defocus is (−DF), the direction of defocus is judged as negative at the step (#18), the flow goes to (#21) where the speed is set to a half of the basic driving speed, that is, (Vz/2), and the driving is effected at the step (#24).

iii) When the detected defocus amount is large in the same zone of the zones (4) through (6) in WIDE zooming mode, the driving speed is changed. That is, this is the case which corresponds to FIG. 11 (d). After the compensator driving direction is set at the step #10) into the direction opposite to that of the above ii), it is judged as NO at the step (#11) through the step (#10'), it is judged as NO respectively at the steps (#12) (#13) and the flow goes to (#14). At the step (#14), because the zone is one of 4 through 6 zones, the flow goes to (#16) where the mode is the WIDE mode, and the flow goes to (#19). Then, if the amount of defocus is (+DF)

at the step (#19), the flow goes to (#21) to set the driving speed two times (2Vz) of the basic driving speed, and the driving is effected at the step (#24).

iv) When the detected defocus amount is large in the same zone of the zones (4) through (6) in TELE zooming mode where the focal length is varied from short focal length to long focal length, the driving speed is changed. In this case the control is opposite to that of the aforementioned iii), and the compensator driving direction is set at the step (#10) into the direction opposite to that of iii), it is judged NO respectively at the steps (#11), (#12), (#13), and the flow goes to (#14). Because the zone is one of (4) through (6) zones at the step (#14), the flow goes to (#16) where the mode is TELE zooming mode, thus the flow goes to (#20). Now, if the amount of defocus is (+DF) which is opposite to that of the case iii), the flow goes to (#22) to set the driving speed to two times (2Vz) of the basic driving speed, and if the amount of defocus is (−DF), the flow goes to (#21) where a half the speed (Vz/2) of the basic driving speed is set so that the driving speed is controlled to come close to the ideal follow-up curve (A), and the driving is effected at the step (#24).

v) When the detected defocus amount is large in the same zone of the zones (1) through (3) in TELE zooming mode, the driving speed is changed. In this case, the control is opposite to that of the aforementioned case ii), the compensator driving direction is set at the step (#10) into the direction opposite to that of the case ii), the flow goes through (#10'), it is judged as NO respectively at the steps (#11), (#12), (#13), and the flow goes to (#14). Because the zone is one of (1) through (3) at the step (#14), the flow goes to (#15) and then to (#17). If the amount of defocus is also (+DF) in this case in contrast to the case ii), the flow goes to (#21) to set the driving speed to a half (Vz/2) of the basic driving speed, and if the amount of defocus is (−DF) the flow goes to (#22) where two times (2Vz) of the basic driving speed is set so that the driving speed is controlled to come close to the ideal follow-up curve (A), and the driving is effected at the step (#24). The speed of the compensator is controlled as stated above so that it is caused to come close to the ideal follow-up curve (A) under any condition. When the zooming operation is completed and the zoom operation key is released, this condition is sensed at the step (#6), and at the step (#7) the flow goes to the AF routine (AF), and the normal AF operation is carried out by the steps (#8) (#9). At the step (#9), the compensator is driven and the variator is stopped of driving thereby completing the zooming. If due to some causes the focus is shifted during zooming, the shifted focus is compensated by the normal AF operation.

Figure 16:
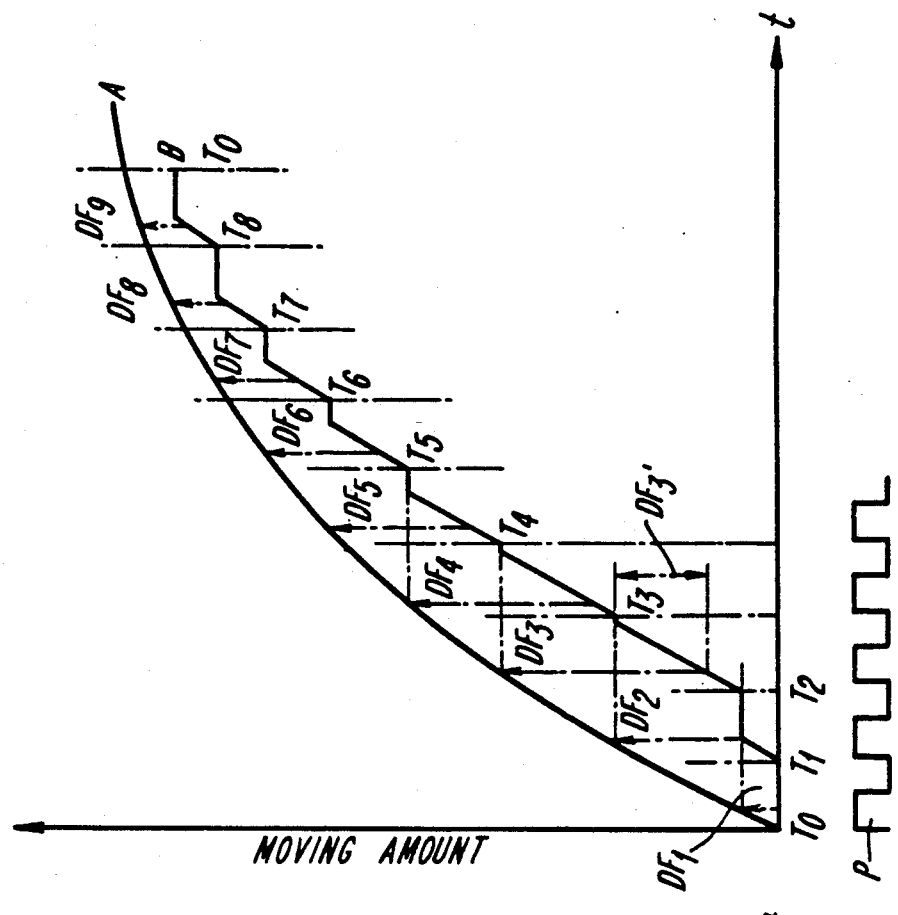
FIG. 16 is diagram to show the follow-up characteristic of a conventional compensator in order to clarify the effect indicated by the follow-up characteristic shown in FIG. 15.
Figure 15:
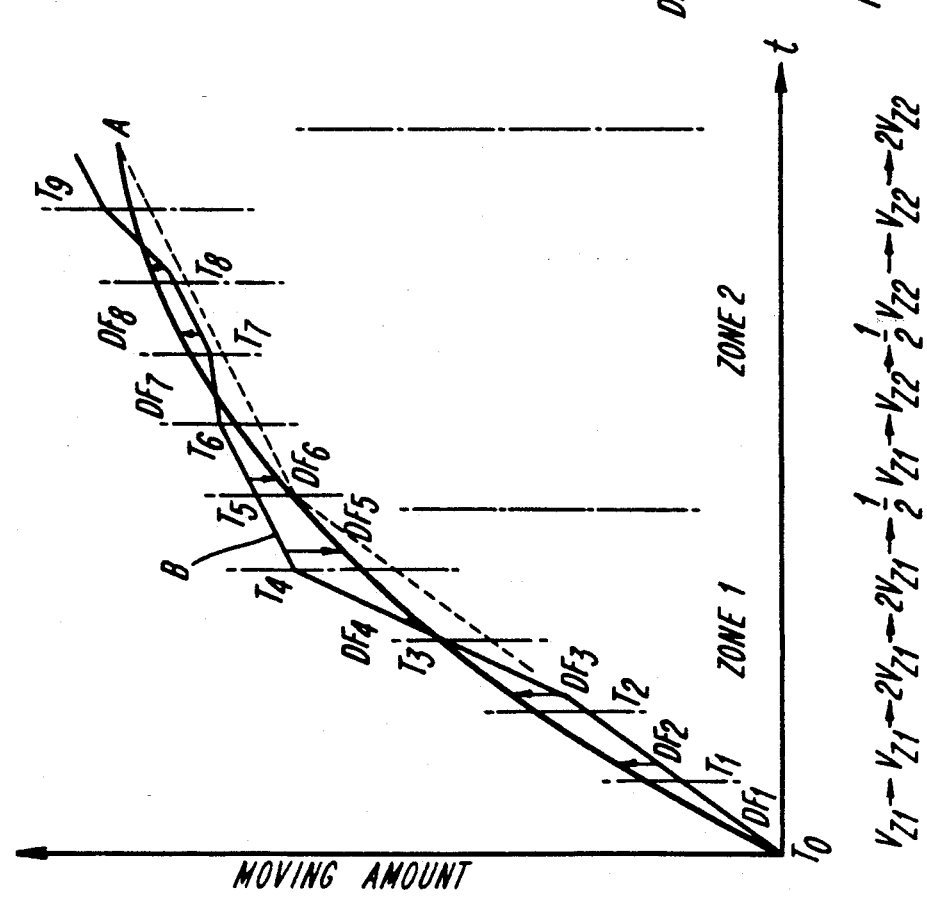
FIG. 15 is a diagram of the actual focus control expressed by the follow-up characteristic based on FIG. 12.

The compensator following-up (focus compensation) is carried out during zooming as described above. FIG. 15 shows the follow-up characteristic with respect to the zones (1) and (2) when such speed control is conducted. FIG. 15 shows the compensator follow-up characteristic when zooming is effected from the TELE end to the WIDE direction using the taking lens which has the same compensator moving characteristic as shown in FIG. 16. When the zooming is carried out from the in-focus condition, after the depression of the WIDE switch 82B is detected first, the driving direction of the compensator 5 is determined at the moment the variator 4 is moved in the WIDE direction, and the compensator 5 is driven at the basic driving speed (Vz/2). The speed control after ($T_1$) is carried out in the manner described below.

(I) Basic driving speed $Vz_1$ between $T_0$ to $T_1$
(II) $DF_1$ (<1) is detected at $T_1$ to obtain $Vz_1$.
(III) $DF_2$ (≧1) is detected at $T_2$ to obtain $2Vz_1$.
(IV) $DF_3$ (≧1) is detected at $T_3$ to obtain $2Vz_1$.
(V) $DF_4$ ($|DF_4|$≧1) is detected at $T_4$ to obtain $Vz_1/2$.
(VI) Zone change is detected at $T_5$ to obtain $Vz_2$.
(VII) $DF_6$ ($|DF_6|$≧1) is detected at $T_6$ to obtain $Vz_2/2$.
(VIII) $DF_7$ (<1) is detected at $T_7$ to obtain $Vz_2$.
(IX) $DF_8$ is (≧1) is detected at $T_8$ to obtain $2Vz_2$.

In this case, as it is apparent by comparing with FIG. 16, the compensator 5 moves continuously. That is, in FIG. 16, after the compensator is moved out by the defocus amount calculated in accordance with the focus condition detection output, it is stopped once, and awaits for the result of focus condition detection, that is, the compensator moves while repeating the focus condition detection, moving, and stopping one by one in such manner as above. In FIG. 15 however, the compensator 5 does not stop and keeps moving, so that the driving speed thereof is changed and controlled during compensator moving. In the way as described above, the focus control with good follow-up performance is realized during zooming. Incidentally, in this embodiment, the ROM is only required to have the basic driving speed of six zones of (1) through (6). In the zone (1) and the zone (2) in FIG. 15, the multiplication rule of coefficient such as ½ or 2 with respect to the basic driving speed of the zones (1), (2) is the same, but it is possible to change this rule by zones.

Figure 13:
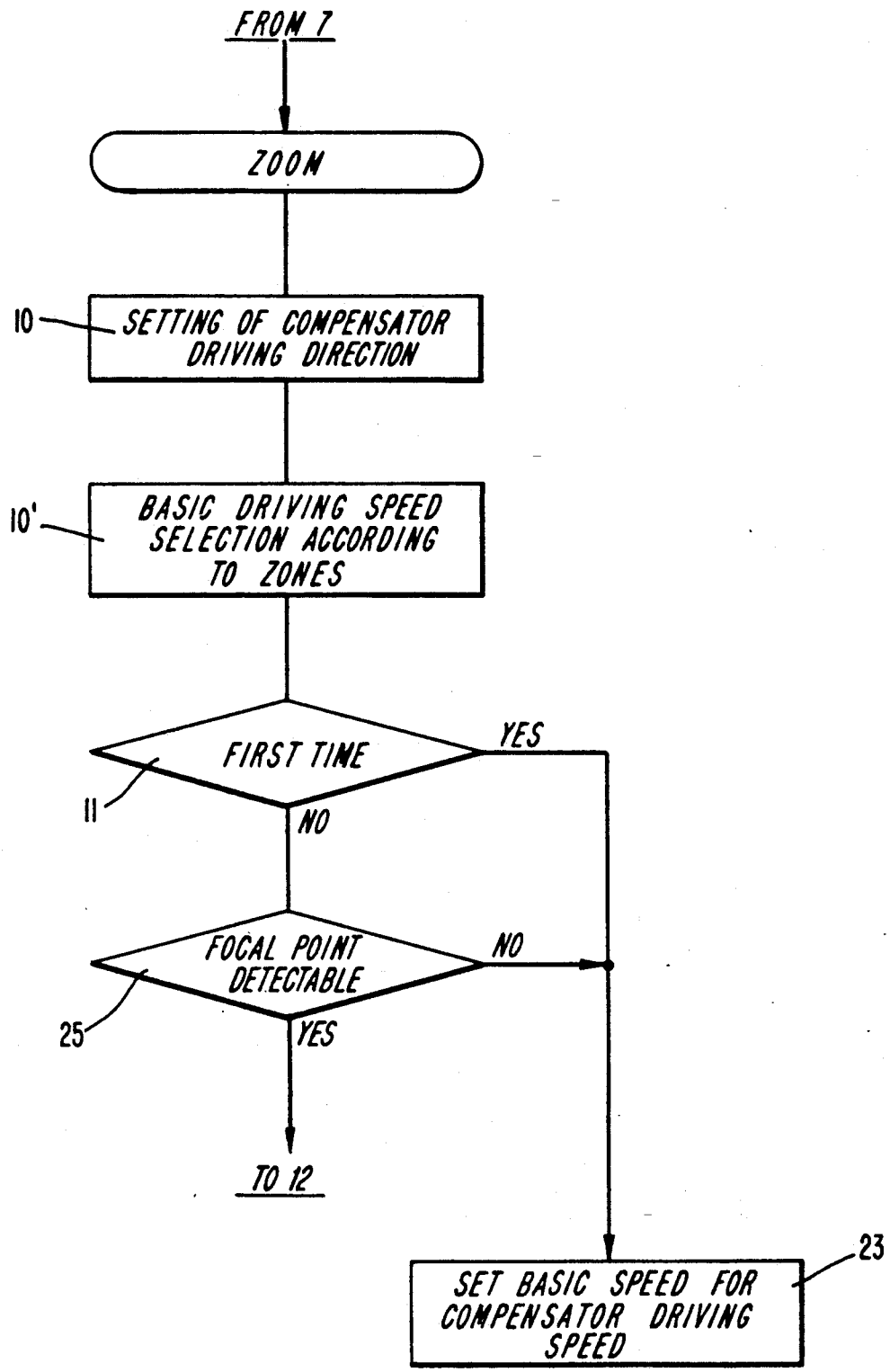
FIG. 13 and FIG. 14 are diagrams showing the embodiment shown in FIG. 12 with a partial change made thereof.

As a countermeasure in case the focus condition detection is impossible in FIG. 12, the step (#25) to judge the possibility of the focus condition detection is provided between the steps (#11) and (#12) as shown in FIG. 13, and if the focus condition is detectable, the flow is caused to advance to (#12), but if the focus condition is not detectable, then the flow may be caused to advance to the step (#23) and the compensator may be driven at the basic driving speed. In this case, there occurs no major follow-up error even if the detection becomes impossible temporarily when the information of the photographic subject in the focus condition detection area is changed by the change in the angle of view made during zooming. In addition, if the focus condition becomes detectable thereafter and if the result of detection can be obtained, the flow goes to the routine after the step (#12). Therefore, it becomes possible to continue the follow-up by subsequent speed control operation.

Figure 14:
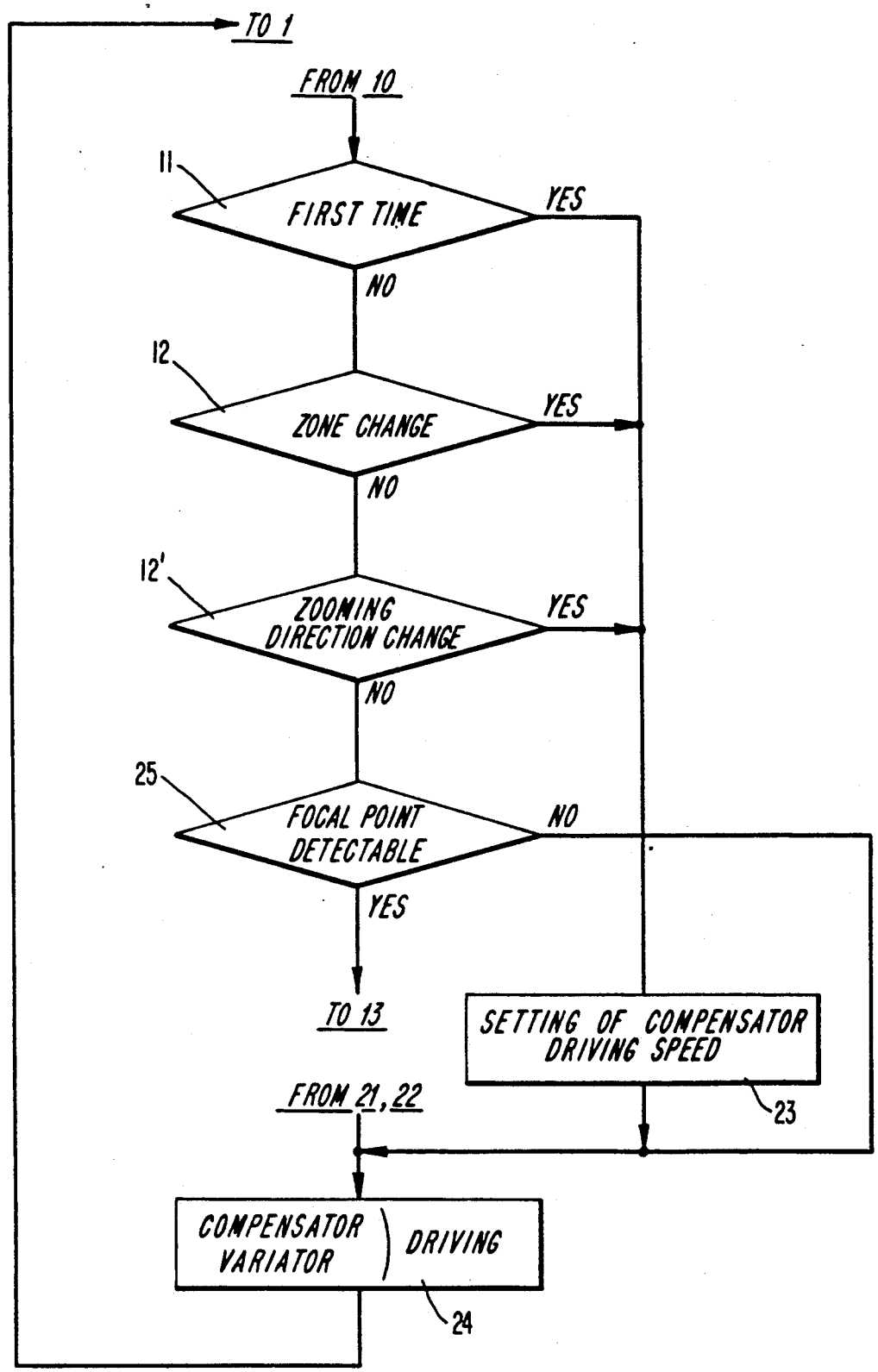

Furthermore, as shown in FIG. 14, the step (#25) to judge the possibility of the focus condition detection can be provided between the steps (#12') and (#13), and if the focus condition is detectable, the flow is caused to advance to (#13), but if the focus condition is not detectable, the flow skips to (#24), so that the compensator is driven with the preceding driving speed. The effect achieved in this case is the same as that of the embodiment shown in FIG. 13.

In the above, the present invention has been described with respect to a video camera, but it should not be construed that the present invention is limitative thereto but is applicable in the same manner to the ordinary cameras employing films.

While only certain embodiments of the present invention have been described, it will be apparent to those skilled in the art that various changes and modifications may be made therein without departing from the spirit and scope of the present invention as claimed.

What is claimed is:

1. A camera comprising:

an optical system having a first lens group that is stationary, a second lens group arranged behind the first lens group for varying a focal length of said optical system and a third lens group arranged behind the second lens group for adjusting a focus of said optical system to dissolve a defocus condition caused by the variation of the focal length accomplished by the second lens group;

first driving means for driving the second lens group;

second driving means for driving the third lens group;

linear movement means driven by at least one of said first and the second driving means thereby linearly moving at least one of the second and the third lens groups;

a housing of the camera which is formed so as to cover said optical system, said linear movement means and said first and the second driving means; and a zoom operation member which is provided on said housing and is used for operating said first driving means for the zooming operation.

2. A camera as claimed in claim 1, further comprising:

focus detecting means for detecting a focus condition of said optical system by receiving a light passed through said optical system; and controlling means for controlling the second lens group so as to adjust the focus of said optical system based on the result of the focus detection by said focus detecting means.

3. A camera as claimed in claim 2, wherein said second driving means includes a pulse motor.

4. A camera as claimed in claim 2, wherein said linear movement means causes linear movement of both of the second lens group and the third lens group.

5. A camera as claimed in claim 3 wherein said linear movement means causes linear movement of both of the second lens group and the third lens group.

* * * * *